Patented Feb. 11, 1947

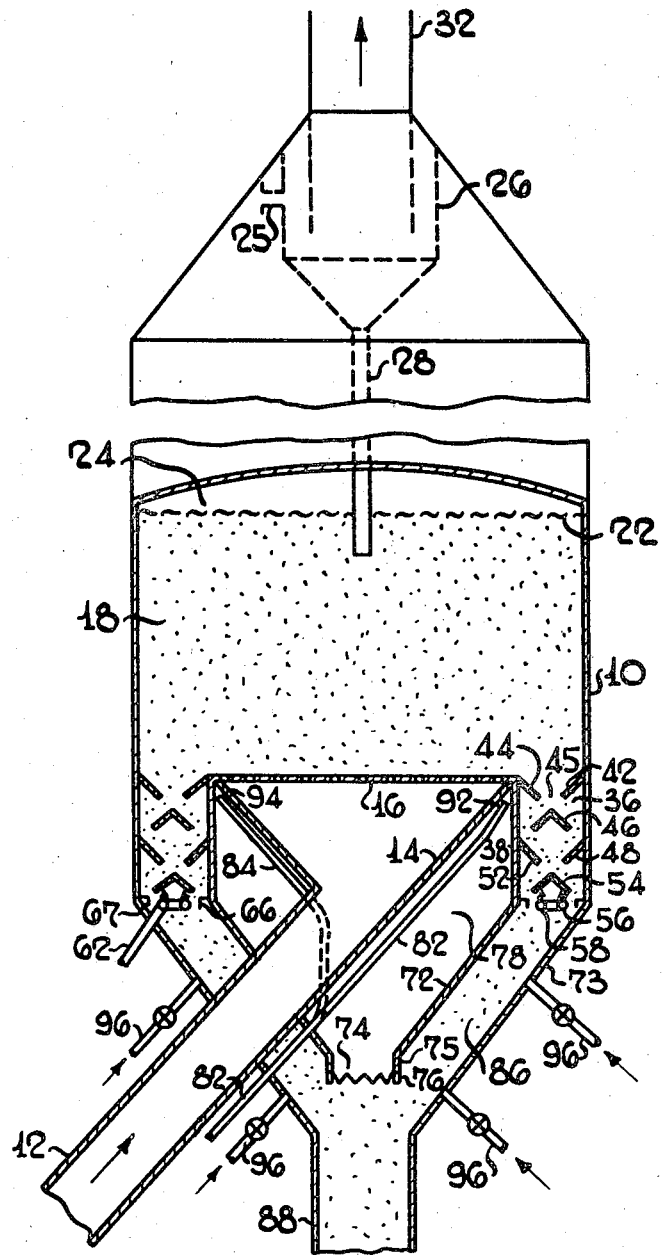

2,415,756

UNITED STATES PATENT OFFICE 2,415,756

CONTACTING SOLIDS WITH GASEOUS FLUIDS

Earl J. Le Roi and John H. Johnsen, Baton Rouge, La., assignors to Standard Oil Development Company, a corporation of Delaware Application January 23, 1945, Serial No. 574,101

5 Claims. (Cl. 23—288)

This invention relates to apparatus adapted for use in contacting solid particles with gaseous fluids, and more particularly, relates to stripping or purging entrained volatile material from solid particles.

In certain catalytic operations, such as the catalytic cracking of hydrocarbon oils to produce lower boiling hydrocarbons, hydrocarbon gases and/or vapors are entrained with the catalyst or contact particles removed from the contacting or conversion zone and it is preferred practice to remove such vapors and/or gases from the particles before using them in another contacting or conversion step or before regenerating them prior to re-use in another contacting or conversion step.

During catalytic conversion of hydrocarbons as, for example, catalytic cracking, coke or carbonaceous material is deposited on the particles and the spent or contaminated particles withdrawn from a conversion or reaction zone contain entrained hydrocarbon vapors and gases.

In the improved design of catalytic cracking units, the catalyst or contact particles are maintained in a dense, dry, fluidized liquid-simulating condition in the reaction zone wherein hydrocarbons in vapor or gas form are contacted with the solid contact particles. The hydrocarbon vapors or gases pass upwardly through the dense fluidized mixture in the reaction zone and the vaporous reaction products containing only a small amount of entrained solid particles are taken overhead from the reaction zone. The spent or contaminated contact or catalyst particles are withdrawn as a dense fluidized mixture from the bottom of the reaction zone.

The spent or contaminated particles withdrawn from the reaction zone contain entrained hydrocarbon vapors or gases, and before regenerating the particles it is preferred practice to remove the entrained hydrocarbons in a stripping or purging step to recover the hydrocarbons and to reduce the amount of burning necessary in the regeneration zone.

The present invention relates to an improved design for a stripping or purging section or zone in such a reaction zone. In the preferred form of the reaction vessel the mixture of catalyst or contact particles and hydrocarbon vapors or other reactant is introduced into the bottom portion of a reaction zone through a hollow conical member or chamber provided with a horizontally arranged perforated distribution plate. Surrounding the conical member is an annular space or chamber formed by a sleeve or skirt depending from the conical member and spaced from the inner wall of the reaction vessel. This skirt extends a distance below the distribution plate and forms with the wall of the vessel an annular stripping section in the lower portion of the reaction vessel.

In the preferred form of our invention the annular stripping section is subdivided into a plurality of stripping sections by a baffle construction. The particular baffle construction disclosed is a disc and doughnut baffle. Steam or other stripping gas is introduced at a plurality of points at the bottom portion of the annular stripping section and passes upwardly through the stripping section countercurrent to the downflowing catalyst or contact particles being stripped or purged.

The space below the conical inlet member is reduced in volume by a lower inverted conical member extending from the skirt and spaced from and substantially parallel to the conical bottom portion of the reaction vessel. In this way the volume below the first mentioned conical inlet member is reduced and this reduces the holding time of the catalyst particles in the stripping section. In the catalytic cracking of hydrocarbons the contaminated catalyst or contact particles are at a high temperature and prolonged holding of the mixture at this high temperature in the presence of steam, which is the preferred stripping and fluidizing gas, results in a significant loss of activity.

Provision is also made for maintaining the space between the upper conical inlet member and lower spaced conical member substantially clear of dust particles by extending one or more pipes or tubes into the space and continuously releasing a purging gas into this space.

In the drawing, the figure represents a longitudinal vertical cross-section of a reaction vessel including our improved stripping apparatus.

Referring now to the drawing, the reference character 10 designates a reaction vessel provided with an inlet line 12 for introducing a mixture of reactants and the catalyst or contact particles. In the catalytic cracking of hydrocarbons, the reactant fluid comprises hydrocarbons in liquid or vapor form or partly in liquid and partly in vapor form, such as gas oil, reduced crude oil, whole crude petroleum oil, heavy naphthas, etc.

The catalyst or contact particles in a cracking operation comprise hot regenerated catalyst or contact particles and some of the heat is supplied to the reactants and to the reaction or conversion by the hot regenerated catalyst particles.

The suspension of solid particles in gaseous fluid reactants is passed upwardly through line 12 into hollow, upwardly flared conical inlet member 14 arranged in the bottom portion of the reaction vessel 10. The conical member 14 is provided with a horizontally arranged perforated distribution plate 16 at its upper end.

In the form of the apparatus shown in the drawing, the reaction vessel 10 is cylindrical and the perforated distribution plate member or grid is circular and centrally disposed in the lower portion of the reaction vessel 10. The diameter of the distribution plate member 16 is less than the internal diameter of the reaction vessel in order to provide an annular space for withdrawing solid particles from the bottom portion of the reaction vessel as will be hereinafter described in greater detail.

The velocity of the gaseous reactant fluid passing upwardly in the reaction zone or vessel 10 is preferably selected to maintain the solid particles in a dense fluidized liquid-simulating dry mixture or bed 18 having a level indicated at 22 with a dilute phase or dilute suspension thereabove designated at 24. As the vaporous reaction products leave the dense bed or mixture 18, they entrain a small amount of solid particles and this suspension comprises the dilute phase designated at 24. The dense fluidized mixture or bed 18 is maintained as a mobile and turbulent mass or mixture and in this way insures intimate contact between the gaseous fluid and the contact particles.

In the catalytic cracking of hydrocarbons, the cracking catalyst comprises any suitable cracking catalyst, such as acid-treated bentonite clay, synthetic silica alumina gel, synthetic silica magnesia gel, etc. The catalyst is preferably in powdered or finely divided form in which the particles have a size between about 100 and 400 standard mesh. The preferred catalyst is made up of particles of which about 95% passes through 100 standard mesh and the mixture contains less than 35% of 0 to 20 micron material. With such a catalyst the velocity of the gaseous fluid passing upwardly through the dense bed or mixture 18 is about 0.5 ft./second to 2.0 ft./second and under these velocity conditions the density of the mixture forming the dense bed 18 is about 5 lbs./cu. ft. to 40 lbs./cu. ft.

The light suspension designated at 24, including the vaporous reaction products, is passed through inlet 25 of separating means 26 arranged in the upper portion of the reaction vessel 10 to separate most of the entrained solid particles from the vaporous reaction products. The separated solid particles are returned to the dense bed or mixture 18 through line or pipe 28 which extends below the level 22 of the dense bed or mixture 18. The vaporous reaction products leaving the separating means 26 pass overhead through line 32 and may be passed to any suitable equipment to recover desired products.

In the catalytic cracking or conversion of hydrocarbons, the vaporous reaction products are passed to a fractionating system to separate gasoline or motor fuel from gases and higher boiling hydrocarbon constituents. Other forms of separating means may be used or more than one separating means may be used in series for more completely separating the solid particles from the vaporous reaction products leaving the reaction zone or vessel 10.

Arranged around the periphery of the conical inlet member 14 at the lower portion of the reaction vessel 10 is a stripping zone or section, indicated at 36, which is annular in form and which is formed between the inner wall of the vessel 10 and a smaller-diameter, concentrically and vertically arranged sleeve or skirt 38 which extends downwardly from the distribution plate member 16. The upper end of the sleeve or skirt 38 is secured and sealed to the periphery of the conical inlet member 14 to prevent leakage around the edge of the plate member 16.

The stripping zone or section 36 is provided with a baffle construction for effecting intimate contact between the solid particles and the stripping gas. This baffle construction comprises a disc and doughnut baffle construction and is suitably supported in section 36. The upper disc construction comprises inclined annular members 42 and 44. The annular member 42 is secured to the inner wall of the vessel 10 and projects inwardly and downwardly a short distance. The other annular baffle member 44 is attached to the skirt or sleeve 38 and projects downwardly and outwardly from said sleeve or skirt and toward the other baffle construction 42. The adjacent lower ends of the annular baffles form a narrowed opening 45 through which the spent or fouled catalyst or contact particles are passed.

The next lower baffle construction comprises a disc 46 which is of inverted V shape in cross section with the apex directly beneath the narrowed opening 45 so that the stream of solid particles is subdivided into two streams as it passes downwardly over the disc. The lower ends of the disc are spaced from the inner wall of the vessel 10 and the skirt 38 to permit downward passage of the solid particles to the next doughnut baffle construction.

The next lower doughnut baffle construction comprises inclined annular baffle members 48 and 52 similar to the annular baffle members 42 and 44 above described. Arranged below the doughnut baffles 48 and 52 is a disc baffle 54 which is similar to the baffle disc 46 above described. Circular pipes 56 and 58 are provided having openings in the upper portions thereof for introducing stripping gas, such as steam, into the lower portion of the annular stripping zone or section 36 below the lowermost disc baffle 54. A feed pipe 62 is provided which communicates with the annular pipes 56 and 58 for introducing stripping gas thereto.

While we have shown a certain number of disc and doughnut baffles, it is to be understood that the number may be varied.

Arranged in the lower portion of the stripping section 36 is an inner baffle ring 66, angular in cross-section and having its upper portion secured to the skirt or sleeve 38 and having its lower portion spaced from the sleeve or skirt 38. An outer ring baffle 67, also angular in cross-section, is provided at the lower portion of the stripping section 36 and has its upper portion secured to the inner wall of the reaction vessel 10 and has its lower portion spaced from the inner wall. The rings 66 and 67 provide a restriction in the cross-section at the base of the stripping section to effect more efficient stripping.

Arranged below the conical inlet member 14 and spaced therefrom is an inverted conical baffle member 72 which has its upper portion secured to the bottom portion of the sleeve or skirt 38. The second conical baffle member 72 is spaced from and substantially parallel to the conical bottom 73 of the reaction vessel 10. In this way the effective volume between the conical inlet member 14 and the bottom of the reaction vessel is reduced. The lower conical member 72 is provided with an opening 74 provided with a collar 75 having a serrated lower end at 76. The collar 75 forms an opening into the space 78 between the conical members 14 and 72 and will be described in greater detail hereinafter.

Lines or tubes 82 and 84 are provided for introducing gas into the upper portion of the space 78 between the conical members 14 and 72 to prevent the accumulation of dust or solid particles in this space. As above pointed out, the conical lower baffle member 72 is spaced from the bottom of the reaction vessel 10 to provide a space 86 therebetween for conveying stripped or purged catalyst or contact particles from the stripping section 36 to the standpipe 88 leading from the bottom of the reaction vessel 10. Collar 74 is arranged above the standpipe 88 and is co-axial therewith. Some stripping will take place in space 86 which extends the stripping section 36. Because of the smaller passageway the catalyst passes through space 86 at a higher velocity and this gives improved stripping.

The conical baffle member 72 is provided with the opening 75 above described and has the notched or serrated lower end 76. Line or pipe 82 passes through conical bottom 73 and opens into the upper portion of space 78 adjacent and exterior to the upper portion of conical inlet member 14 and adjacent the upper part of sleeve or skirt 38. Preferably pipe 82 is positioned below inlet line 12 between conical member 72 and conical bottom 73 to protect it from erosion by the downwardly moving catalyst. Within space 78 line 82 has a branch line 84 extending upwardly in space 78 on the opposite side of conical member 14. Pipe 82 has open end 92 and branch pipe 84 has open end 94 for introducing gas, such as steam or flue gas, into the space 78 between conical members 14 and 72 to prevent the accumulation of dust or solid particles in the space 78. The introduced gas vents through the opening 74 in collar 75 and is evenly distributed to the space 86 by the serrations on collar 75. While we have shown only two lines 82 and 84, it is to be understood that more lines of this character may be used to distribute the introduced gas more evenly into the space 78.

The lower portion of ring 66 attached to the inner wall of the vessel 10 below stripping section 36 is preferably serrated or notched to insure even distribution of gas into the stripping section 36. This gas rises from below and some of this gas comes from the bleed gas introduced into space 78 and vented from the space through collar 75. Another portion of this gas comes from the upper portion of standpipe 88 and comprises gas used for fluidizing the solids in the standpipe.

Gas is preferably introduced into the cone shaped bottom 73 of vessel 10 through one or more lines 96 to maintain the solid particles in fluidized liquid-simulating condition in the space 86 and some of this gas is released and passes upwardly and into the stripping section 36 by distributing serrations on ring 66. In addition, as the fluidized solids pass through space 86, some additional gas may be liberated by settling of the fluidized mixture of solids to a higher density. Some stripping of the particles may take place in space 86 as the fluidized mixture passes downwardly therethrough.

The conical members 14 and 72 are suitably supported by the conical bottom 73 of the vessel 10.

The space 86 between conical member 72 and conical bottom 73 forms a passageway of relatively small volume for conducting the stripped solid particles from the stripping section 36 to the top of standpipe 88. In previous arrangements the space below the conical inlet member 14 was open or unobstructed and a large amount of solid particles accumulated in this space and the catalyst particles were held up in this space in the bottom of the vessel.

The catalyst particles passing from the reaction zone are at a high temperature and the deactivation of the catalyst particles is accelerated at high temperatures by contact with steam used as a stripping and fluidizing gas. In previous arrangements the hold up of the catalyst in the conical bottom of the reaction vessel was about 20% of the total operating time. With the introduction of the lower conical member 72 the total volume in the bottom of the reaction vessel where catalyst hold up is encountered is reduced by about 37% so that the catalyst is held up for a shorter time in the bottom of the reaction vessel.

The baffle construction 42, 44, etc., in the stripping section 36 increases the efficiency of the stripping step as it results in stripping in a plurality of stages. With the baffle construction, better contact between the catalyst particles and stripping gas is obtained. Other forms of baffles may be used. With the reduced volume 86 the catalyst is held up for a shorter time and deactivation of the catalyst is reduced.

The operation of our apparatus will now be described in connection with catalytic cracking of hydrocarbons. Powdered catalyst and hydrocarbon oil vapors, such as gas oil vapors, are passed through line 12 and through distribution plate 16 to form a dry fluidized liquid-simulating and turbulent mixture 18 in the reaction vessel 10. The temperature during cracking may vary between about 800° F. and 1100° F. The catalyst to oil ratio may vary between about 5 to 1 to 35 to 1 by weight.

During the cracking operation the catalyst particles become fouled or spent by the deposition of coke or carbonaceous material on the particles. The fouled catalyst particles in a fluidized condition and containing entrained hydrocarbon vapors and gases are withdrawn from the dense bed or mixture 18 and passed into the upper part of the stripping section 36. Stripping gas, such as steam, is introduced into the lower portion of the stripping section 36 through lines 56 and 58. The stripping gas passes upwardly through the stripping section 36 countercurrent to the downward flow of the fluidized catalyst mixture. The baffle construction 42, 44, etc., in the stripping section brings about intimate contact between the catalyst particles and the stripping gas and improved stripping is obtained. The stripping gas and stripped-out vapors and gases pass upwardly into the dense bed or mixture 18 in the reaction vessel 10.

The stripped particles in fluidized condition pass to reduced passageway 86 and then to the standpipe 88 which is used to generate hydrostatic pressure to move the spent and stripped particles to a regeneration zone or vessel (not shown).

The amount of spent catalyst passing through the stripping section 36 in a commercial unit is about 2400 tons per hour and the amount of steam used in stripping is about 9000 lbs. hour. The steam is at a temperature of about 950° F. The velocity of the stripping gas passing upwardly through the stripping section is about 1 ft./second under these conditions.

The catalyst hold up time following the stripping step in our improved design is reduced by about 37%.

While our improved stripping device has been specifically described in connection with catalytic cracking of hydrocarbons to produce gasoline, it is to be understood that our device may be used for removing volatile material from solid or contact particles in other reactions generally and more particularly with other hydrocarbon conversion reactions such as dehydrogenation of butane and butene fractions, aromatization of naphthas, coking of heavy residual oils and the like, and also may be used generally in other catalytic or non-catalytic reactions involving reactions of organic or inorganic material and not restricted to hydrocarbon material, such as oxidation of alcohols to aldehydes or acids, reduction of oxides or preparation of pure anhydrous hydrogen chloride.

While we have set forth the best form of apparatus known to us, it is to be understood that this is by way of illustration only and various changes and modifications may be made without departing from the spirit of our invention.

What is claimed is:

1. An apparatus of the character described including a vessel adapted to contain a fluidized bed of solid particles and for contacting gaseous fluid and said solid particles and having a top outlet for gaseous fluid and a bottom outlet for solid particles, an inverted conical inlet member arranged in the lower part of said vessel provided at its upper end with a horizontally extending perforated plate, said conical member and perforated plate being arranged centrally of said vessel and spaced from the inner wall of said vessel, a vertically arranged baffle member in sealed contact with the upper portion of said conical member extending downwardly therefrom and arranged to provide a space between said inner wall of said vessel and said baffle member for forming a stripping section for downward flow of said fluidized particles, means for introducing a stripping gas into the lower portion of said space, a second lower inverted conical member having its upper portion sealed to the bottom of said baffle member so arranged as to reduce the volume below said conical inlet member and form a continuation of said space communicating with said outlet for flow of fluidized particles thereto.

2. An apparatus according to claim 1 wherein said vessel has a conical bottom and said second conical member is spaced from said conical bottom and substantially parallel thereto.

3. An apparatus according to claim 1 wherein said second conical member has an opening in its bottom portion and also includes means for introducing a gas into the space between said conical members to prevent accumulation of solid particles therein.

4. An apparatus according to claim 1 wherein said vessel is cylindrical and said baffle member comprises a sleeve concentrically arranged with respect to said vessel.

5. An apparatus of the character described including a vessel adapted to contain a fluidized bed of solid particles and for contacting gaseous fluid and said solid particles and having a top outlet for gaseous fluid and a bottom outlet for solid particles, an inverted conical inlet member arranged in the lower part of said vessel provided at its upper end with a horizontally extending perforated plate, said conical member and perforated plate being arranged centrally of said vessel and spaced from the inner wall of said vessel, a vertically arranged baffle member in sealed contact with the upper portion of said conical member extending downwardly therefrom and below the lower portion of the conical inlet member arranged to provide a space between said inner wall of said vessel and said baffle member for forming a stripping section for downward flow of said fluidized particles, means for introducing a stripping gas into the lower portion of said space, a second inverted conical member below said conical inlet member and having its upper portion sealed to the bottom of said baffle member so arranged as to reduce the volume below said conical inlet member and form a continuation of said space communicating with said outlet for flow of fluidized particles thereto.

EARL J. LE ROI.
JOHN H. JOHNSEN.

REFERENCES CITED

The following references are of record in the file of this patent:

UNITED STATES PATENTS

| Number | Name | Date |
| --- | --- | --- |
| 2,388,078 | Reeves | Oct. 30, 1945 |